United States Patent [19]
Grønskov

[11] Patent Number: 6,119,353
[45] Date of Patent: Sep. 19, 2000

[54] METHOD AND APPARATUS FOR NON-CONTACT MEASURING OF THE DEFLECTION OF ROADS OR RAILS

[75] Inventor: Leif Grønskov, VallensbækStrand, Denmark

[73] Assignee: Greenwood Engineering ApS, Brondby, Denmark

[21] Appl. No.: 08/913,648

[22] PCT Filed: Apr. 2, 1996

[86] PCT No.: PCT/DK96/00159

§ 371 Date: Sep. 19, 1997

§ 102(e) Date: Sep. 19, 1997

[87] PCT Pub. No.: WO96/31655

PCT Pub. Date: Oct. 10, 1996

[30] Foreign Application Priority Data

Apr. 3, 1995 [DK] Denmark ................................ 0372/95

[51] Int. Cl.[7] ........................... G01C 7/04; G01B 11/245; G01N 3/40
[52] U.S. Cl. ................. 33/1 Q; 33/264; 33/287; 33/521; 73/84; 73/146
[58] Field of Search .................. 33/1 Q, 264, 287, 33/713, 719, 521, 533, 651; 73/84, 105, 146; 356/3, 4.07, 5.09, 376

[56] References Cited

U.S. PATENT DOCUMENTS

| | | | |
|---|---|---|---|
| 4,288,855 | 9/1981 | Panetti | 33/1 Q |
| 4,658,639 | 4/1987 | Arnberg | 73/84 |
| 4,781,058 | 11/1988 | Arnberg | 73/84 |

FOREIGN PATENT DOCUMENTS

| | | | |
|---|---|---|---|
| 284020 | 11/1990 | Japan | 33/521 |
| 107711 | 5/1991 | Japan | 33/521 |
| 107712 | 5/1991 | Japan | 33/521 |
| 5404663 | 3/1986 | Sweden . | |
| 8704064 | 10/1987 | Sweden . | |

*Primary Examiner*—Christopher W. Fulton
*Attorney, Agent, or Firm*—Merchant & Gould, P.C.

[57] ABSTRACT

Equipment for non-contact measurement of the deflection of a road (2) comprises a self-propelled vehicle with a load (7) which influences at least one wheel (4), the speed of which is measured in the direction of travel. The equipment further comprises a laser device (8) from which at least one electromagnetic beam (9) is directed towards the rodway in the vicinity of the vehicle, and the Doppler frequency change in the reflection (9) is detected. An electronic circuit (10) continuously registers the results of the measurements and herewith the deflection at normal traveling speed.

14 Claims, 4 Drawing Sheets

BLOCK DIAGRAM

METHOD AND APPARATUS FOR NON-CONTACT MEASURING OF THE DEFLECTION OF ROADS OR RAILS

BACKGROUND OF THE INVENTION

The invention relates to a method for non-contact measurement of the deflection of a road or a rail, and equipment for the execution of this measurement.

The measuring of the movement of train rails and roads under load is of particular interest, in that it is hereby possible to be able to evaluate their carrying capacity, condition, durability and, in certain cases, also direct faults in the surface or the underlying structure, so that repair work can be initiated in the most expedient places.

It is known to measure the deflection of a road, e.g. making use of a so-called Benkelmann's beam which is positioned on the road, after which a vehicle or the like with a heavy load, e.g. 5–15 tons, is driven closely past the measuring beam and the deflection is measured. This is a relatively precise but very slow method for the measurement of the deflection of roads. Vehicles are constructed with such a measuring beam which can intermittently measure the section of a road by movement of the measuring beam, though only at a maximum of 5–10 km/h. When such measurements are to be carried out, it is thus necessary to give serious consideration to the question of security, in that such a slow-moving vehicle is of great danger for the traffic, which means that the measurements must often be shelved for implementation during periods of light traffic, and also while making use of at least one accompanying vehicle with warning signs etc. which, of course, considerably increases the costs of the measurements.

Furthermore, various methods have been developed whereby the road surface is influenced by a falling weight or the like, and deflection-like measurements can be made. These methods are also very slow and provide measuring results only at intervals, i.e. they do not provide continuous measurements of the road surface.

From the Swedish publication no. 457.807 there is known a vehicle with a load, e.g. of 5–15 tons, and on which at least two range finders are mounted which measure the distance to the road surface, e.g. laser-beam measuring devices, one of which measures the distance to the unloaded road surface (reference), while the other measures as closely as possible to the point at which the road surface is influenced by the loaded wheel. If the equipment is suitably adjusted, such a vehicle is able to be driven forwards at a reasonable speed. The difference between the two distance measurements, corrected for angular errors etc., is subtracted, and the difference constitutes the deflection, i.e. the depression due to the load. Since the deflection during normal loading on a vehicle wheel, i.e. of 5–15 tons, is in the order of 1–4 mm, it will be obvious to those familiar with the art that such difference measurements will be encumbered with even much greater errors, in that the depression which is to be measured is in the same order as the irregularities which are normally to be found in the road surface. Consequently, this method has not been found to be successful for road measurements. On the other hand, it could possibly be used for the measurement of the deflection of a railroad track.

ADVANTAGES OF THE INVENTION

According to one aspect of the present invention, the speed of the deflection is measured continuously while the vehicle is traveling by the measurement of the vertical speed of the road or rail using sensors which detect the Doppler frequency change in the reflections from at least one transmitted wave, preferably an electromagnetic beam directed towards the roadway or the train rail, e.g. while using a laser technique, radar technique, ultrasonic technique or other contact-free speed measuring equipment, after which the deflection can be calculated. This may be carried out using equipment comprising at least one device (8) for the transmission of a wave, preferably electromagnetic radiation (9) down towards the roadway, the rail or the rail's underlayer, at least one sensor (8) arranged to detect the Doppler frequency change in the reflections (9) of the emitted radiation, and an electronic circuit (10) for the continuous registration of the detected Doppler frequency changes for the calculation of the speed of the deflection, and where the radiation is laser radiation, radar waves, ultrasonic signals or other radiation which gives rise to a Doppler frequency change at a relative movement between the device (8) and the reflection point (11).

This provides the possibility of carrying out usable measurements at normal driving speed, e.g. at a speed of 70 km/h or faster. With the present invention, it is not distances which are measured, but continuous measurements are made of the speed with which the surface of the road or the rail moves downwards during the passing of the measuring vehicle, and moreover it is possible to carry out continuous measurements of the vertical speed of the road surface or the rail after the passing of the vehicle, i.e. during its resilient movement back to the unloaded state.

When this equipment is mounted on a heavy, self-propelled vehicle, it is possible at suitably high speeds to generate data for the registration and analysis of the carrying capacity and of the condition of the underlying structure. This data is collected electronically by using one or more sensors which measure the speed of the deflection. The sensors are based on laser technique, radar technique or other speed-measuring equipment, and they function by measuring the Doppler frequency change between the radiation emitted and the reflection. At the same time herewith, there is carried out a measurement and registration of the speed of the vehicle in the direction of travel.

By measuring at normal driving speed, the risk of disturbing the traffic is avoided and the risk of accident due to the presence of the measuring vehicle is eliminated.

According to a second aspect of the present invention, speed measurements are carried out at the same time in the vertical direction at a number of positions at or around the loaded wheel or wheels. This may be carried out using the equipment according to the first aspect of the invention, further including a number of devices/sensors (8) mounted on a common bar or beam (23).

The second aspect of the invention provides the possibility of measuring with a suitable number of sensors the whole of the deflection basin which appears around the wheels, and to continuously map this as a basis for carrying out a continuous calculation, e.g. of the rigidity of a road.

Since all of the measurements are carried out continuously and electronically, extensive data material is obtained which must naturally be processed in a suitable manner before it provides any usable results. It is possible hereby to build up a data bank covering known roads or track sections, and to use these stored results in the construction of new roads or railway tracks.

In the processing of such large amounts of data, it will be directly possible to read-out various information concerning the maintenance standard of the relevant section. For example, discontinuations in the data measured will indicate changes in the underlying structure, which e.g. on a concrete road can be due to a seesawing slab of concrete.

According to a third aspect of the present invention, the angle of the electromagnetic beam in relation to a chosen, fixed direction, e.g., vertical, is also continuously determined. This may be carried out using the equipment according to the first aspect of the invention, further including means (36) for measuring the angle of the electromagnetic radiation in relation to a chosen, fixed direction, e.g. vertical.

The third aspect of the invention provides the possibility of making correction for possible measurement errors from emission which is not directed completely at right-angles towards, for example, a road surface. These angle measurements, e.g. in the form of inertia references, can be continuously measured and stored together with the measurements of the Doppler frequency change signals, and can moreover be used for the servocontrol of the equipment, e.g. the laser devices, which emit the radiations for the measurement of the deflection.

According to a fourth aspect of the present invention, the angle of the electromagnetic beam in relation to the trajectory of the road for the section being covered is also continuously determined. This may be carried out using the equipment according to the first aspect of the invention, further including means (36) for measuring the angle of the electromagnetic radiation in relation to the trajectory of the section of the road being measured.

The fourth aspect of the invention permits that the angle measurements are carried out in relation to the curvature of the road or track along which the measuring vehicle is moving, in that regard is hereby also paid to possible gradients or declines and other deviations in the plane of the roadway or rail element during the course of the measurement.

According to a fifth aspect of the present invention, the position of the loaded wheel is also continuously measured. This may be carried out using the equipment according to the first aspect of the invention, further including means (33) for the continuous measurement of the position of the loaded wheel.

The fifth aspect of the invention allows a continuous location measurement to be carried out and, e.g. by means of an odometer or a GPS measuring device, it is possible to continuously store information concerning the actual measurement positions together with the measurement data, and later always be able to determine where the individual measurements have been carried out.

According to a sixth aspect of the present invention, all measurement results are fed to a data processing unit with storage facilities, either for the continuous calculation and registration of the deflection or data which represents the characteristics of the underlayer, e.g. the underlayer's rigidity, or for storage with a view to data processing later. This may be carried out using the equipment according to the first aspect of the invention, further including a data processing unit (30, 31) with storage facilities (37), either for the continuous calculation and registration of the measured deflection, or data which represents the characteristics of the roadway or the trainrail, e.g. its rigidity, or for storage with a view to data processing later. The sixth aspect of the invention provides a complete system for the measurement and registration of deflection which can form the basis for the operational maintenance of the measured section. The data can also be transferred in a commonly-known manner to a databank for the surveillance and maintenance of road sections and railway lines.

THE DRAWING

The invention will now be described in more detail with reference to the drawing, in that FIG. 1A shows in principle the measurement of deflection according to the invention on a section of road, FIG. 1B shows in principle the measurement of deflection according to the invention on a train rail, FIG. 2 shows a block diagram of the measuring equipment according to the invention, FIG. 3A shows schematically the deflection at a point on a road section when passed by a loaded vehicle wheel, FIG. 3B shows the measurement of deflection speed corresponding to FIG. 3A, FIG. 4 shows an example seen from the side of the mounting of a number of laser sensors on a common, fixed measuring beam, FIG. 5 shows a second example, also seen from the side, of the mounting of a number of laser sensors on a common but displaceable measuring beam, and FIG. 6 shows a third example, seen from above, of a measurement setup where the common, fixed measuring beam in FIG. 4 is arranged transversely to the direction of travel for the measurement of the deflection arising from all of the drive-wheels.

DETAILED DESCRIPTION OF THE EMBODIMENTS SHOWN

Figure 1A:
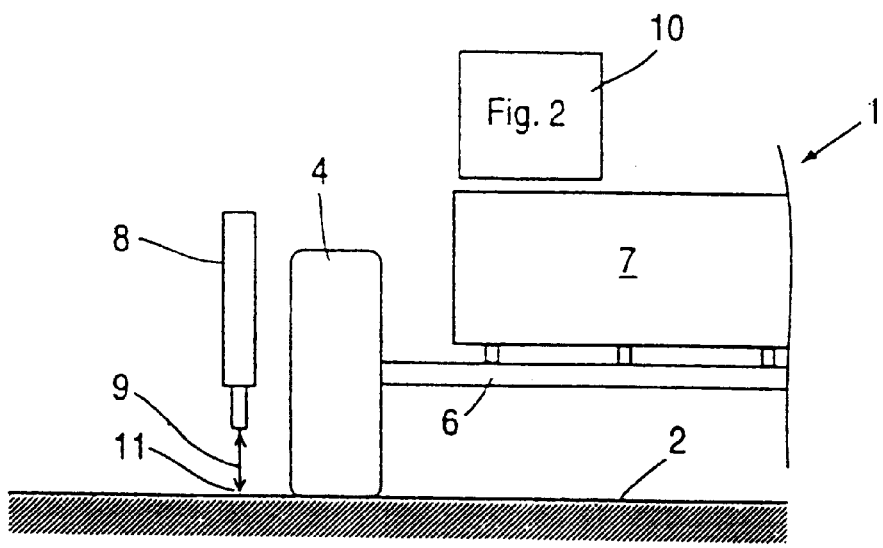

In FIG. 1A is seen a road section 2, the deflection of which is measured with a self-propelled vehicle 1 according to the invention comprising at least one drive-wheel 4 on an axle 6 which is loaded with a possibly displaceable or in another way adjustable load 7 of a suitable number of tons, e.g. 5 tons of sand. On the vehicle there is mounted equipment 10 comprising an electronic measuring and registration system which is discussed later in connection with FIG. 2 of the drawing.

On the vehicle 1 there is also mounted at least one laser device 8 or similar radiation-emitting device from which an electromagnetic beam is directed towards the roadway 2. In the example shown a laser 8 is used, the laser beam 9 of which is directed vertically towards the roadway 2, and at the point where the beam hits the the roadway, a reflection point 11 arises from which the beam is reflected to all sides, also including reflection to the device 8, which also comprises a sensor for the measurement of the frequency of the reflected light and herewith measurement of a possible Doppler frequency change. There is hereby obtained an expression for the speed of the instantaneous deflection when the vehicle is driven at a suitable speed.

With a method and equipment according to the invention, it is anticipated to be able to measure the deflection at running speeds up to 150 km/h. However, the maximum speed for transport vehicles on highways in most countries is 70 km/h, so the maximum speed at which highways can be measured is thus limited to this speed.

Figure 1B:
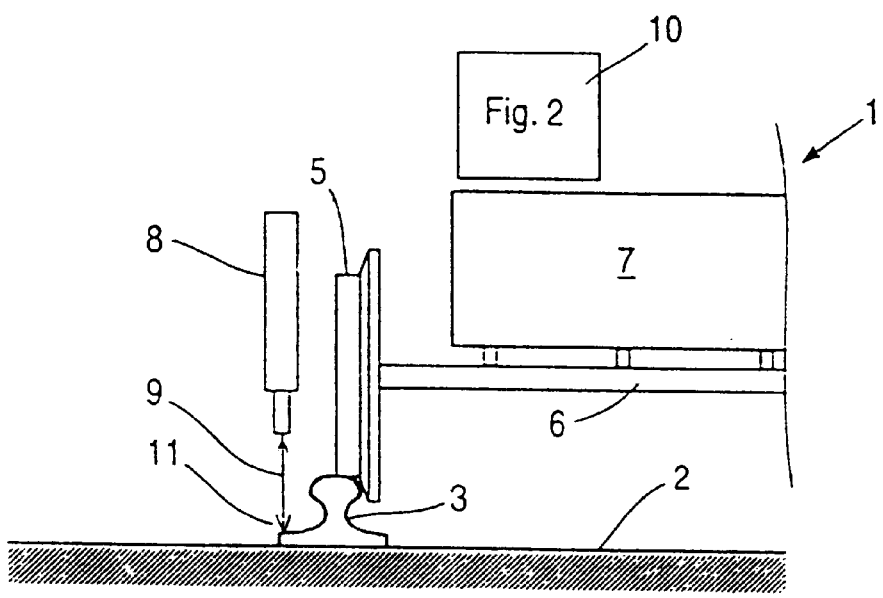

In FIG. 1B is seen a corresponding measurement on a train rail 3 which is loaded by the loaded carriage wheel 5, and where the deflection of the rail is measured, which also includes possible ballast underlayer, sleepers etc., by measuring the speed of the deflection at the foot of the rail in a manner corresponding to that described above. It will also be possible to measure the deflection of the sleepers, possibly at the same time as the measuring of the deflection of the rail, so that comparisons are possible whereby possible faults or deficiencies can be determined in the anchoring of the rail on the sleepers.

FIGS. 1A and 1B are principle methods of measurement which show how the deflection can be measured according to the invention by measuring the deflection speed.

Figure 3A:
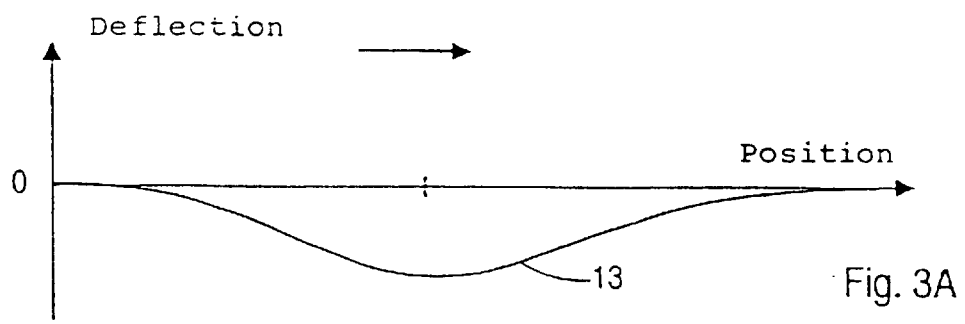

In FIG. 3A is seen an example of a deflection measured at a point on a roadway, e.g. as shown in FIG. 1A. The deflection shown by the curve 13 starts at 0 and increases to maximum value when the wheel passes the point, and decreases again to 0 when the wheel has run past. Depending on the roadway and the characteristics of the underlying structure, different waveforms will be obtained for the curve 13, and therefore also different degrees of maximum deflection will be obtained.

Figure 3B:
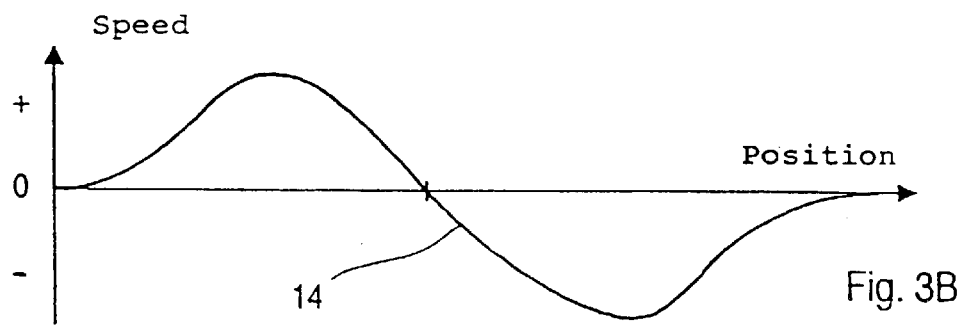

In FIG. 3B is seen the speed measurements corresponding to FIG. 3A from the same measuring point, but measured in accordance with the method according to the present invention. The speed starts at 0 and increases to a maximum speed and hereafter decreases again to 0 where the deflection is at a maximum (in FIG. 3A), in that here the deflection speed is 0. Hereafter, the deflection speed increases again but in the opposite direction, as shown with opposite polarity of the curve, to a maximum (the minimum point of the curve 14) and decreases again towards 0.

The measurement shown in FIG. 3A is that which is attempted to be made with the known apparatus, whereby the curve 13 is recorded, while with the method and equipment according to the invention it is desired to measure the deflection speed 14 shown in FIG. 3B, and at the same time that this is carried out continuously, i.e. points are obtained at relatively short distances, a measurement corresponding to the curve 14 is undertaken at each point along the section.

Figure 4:
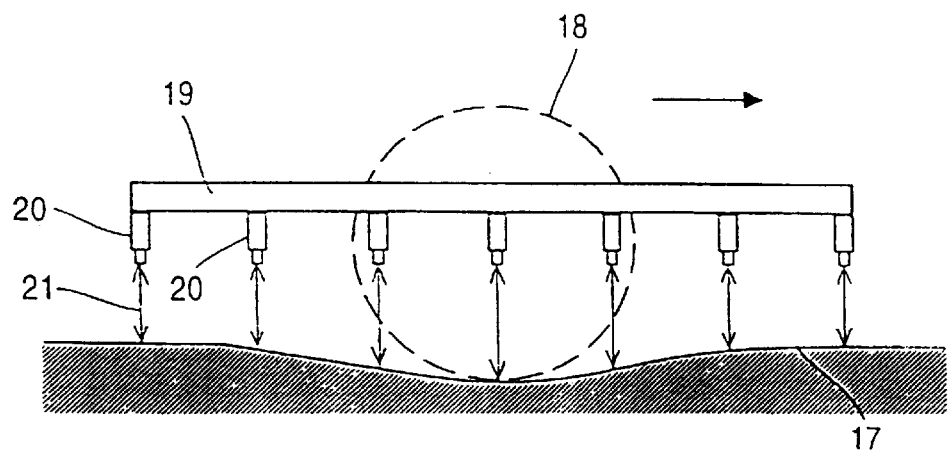

FIG. 4 shows an example of how a number of lasers 20, each with a laser beam 21 and reflection from the roadway, can be mounted on a common, fixed bar 19 and can continuously measure the deflection speed of the roadway when the loaded wheel 18 is driven in the direction of the arrow, hereby also carrying the bar 19 in the same direction, in that this is mounted on the vehicle. It will be seen that the outermost lasers are positioned substantially outside the deflection area, so that they can function as measurement references. The length of the bar 19 is in the order of 1–2 m. With this measuring equipment in connection with the electronic system, which is explained later in connection with FIG. 2, continuous measurements of the deflection of the roadway 17 can be carried out. When the vehicle is standing still, there is a static deflection which can possibly be used for control of the measuring equipment, in that the deflection speed at all lasers will be 0.

Figure 5:
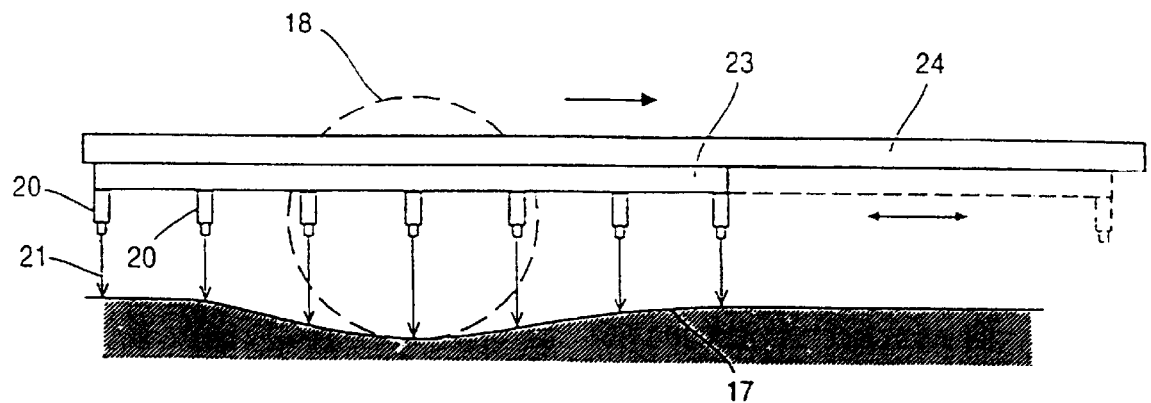

FIG. 5 shows another emodiment of the construction shown in FIG. 4. In this case the bar 23 is suspended in a displaceable manner on a support beam 24, so that the bar and all of the lasers 20 can be moved forwards, possibly backwards, in the direction of travel to a position in which substantially all laser devices 20 measure on that part of the roadway 17 which has no deflection. The lasers 20 can hereby be calibrated against one another.

Figure 6:
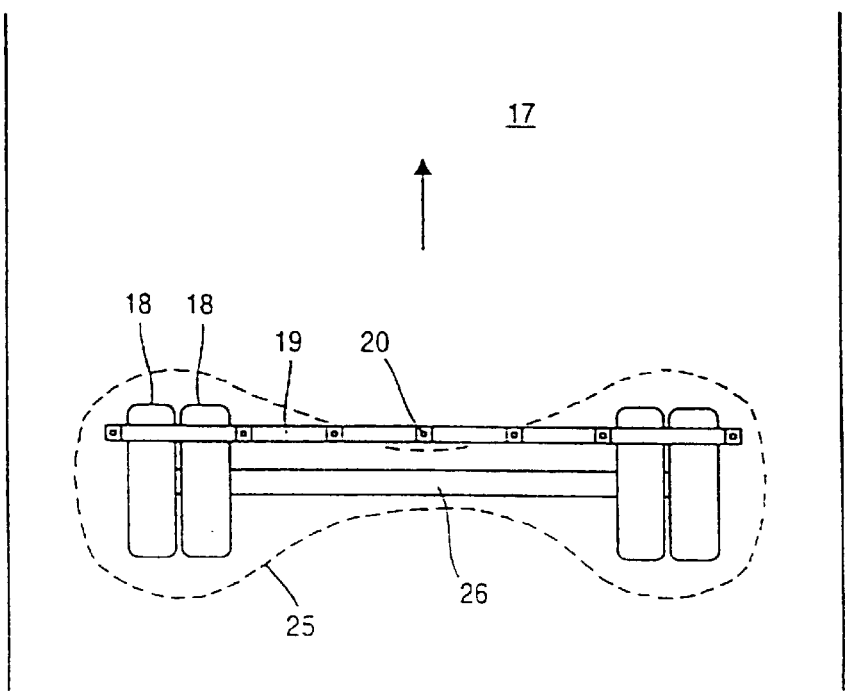

In FIG. 6 is seen an axle 26 in a vehicle on which twin wheels 18 are mounted at each side, all seen vertically from above. The vehicle is provided with a bar 19 in the same direction as the axle 26, i.e. transversely to the direction of travel. The bar 19 is preferably placed in front of the axle 26, and at such a distance that measurements are made at the point at which maximum deflection speed is expected. It is hereby possible to measure the whole of the deflection basin 25 around the wheels 18 by means of a number, e.g. seven, of laser devices 20, which as discussed above measure the speed of the deflection by means of the measured Doppler frequency change. The deflection basin 25, which spreads forwards in the direction of travel, is three-dimensional, and with the achieved measuring results distributed over a portion of the road's breadth, measurement data can be obtained with which an analysis can be made of the condition of the road.

Figure 2:
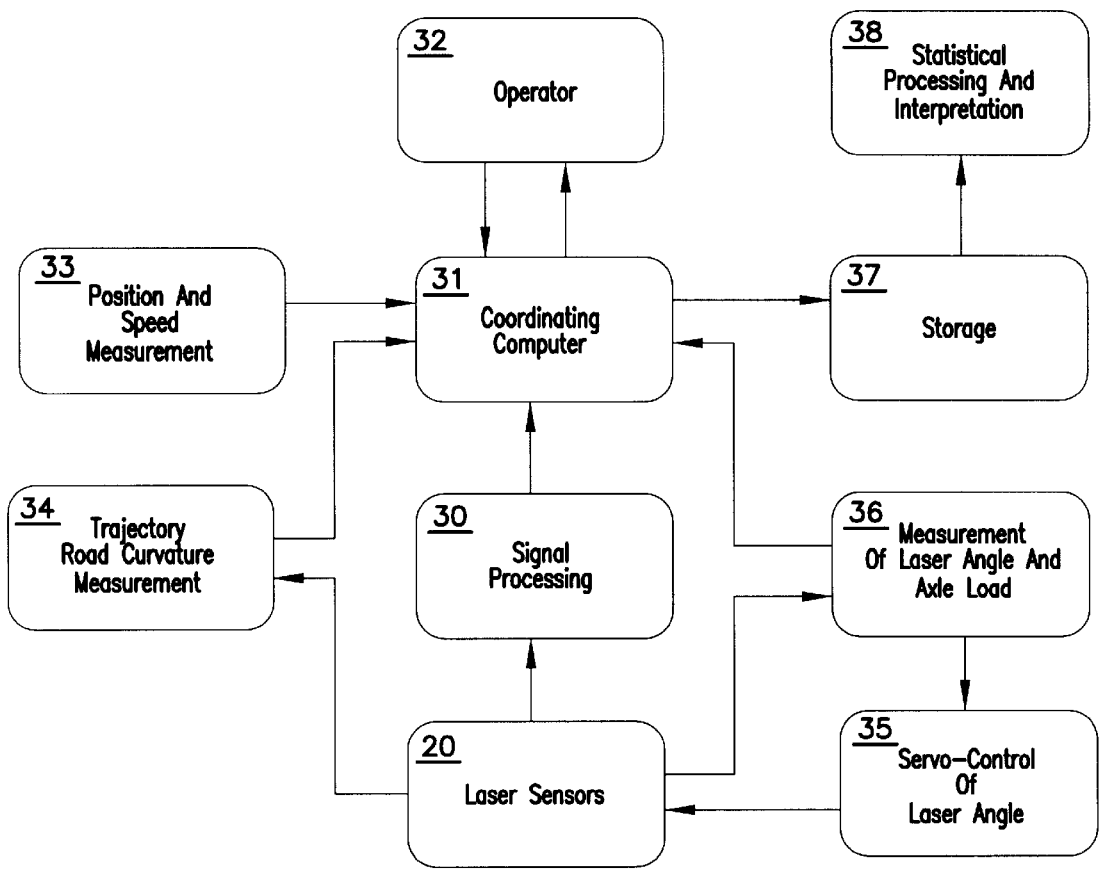

In FIG. 2 is shown a block diagram which shows the relationship between the different parts of the electronic system.

The whole system is mounted on a self-propelled vehicle, e.g. a heavily-loaded vehicle with an axle load of approx. 10 tons. It is possible for the axle load to be changed by making the load on the vehicle displaceable.

The equipment continuously registers the exact location coordinate by means of the circuit 33, and from this and at the same time the speed of the vehicle is measured at the moment of measurement. The equipment 33 can comprise an odometer or a commonly-known GPS position measuring apparatus.

The road curvature measurement block 34 (Trajectory) continuously measures the movement of the laser sensors during the measurement by means of an INS (Initial-Navigation-System), e.g. consisting of a fibre-optic gyroscope (FOG), accelerometer and computers with suitable software, e.g. from the LITEF company. The system measures all movements in three directions. Consequently, it is possible to continuously calculate the exact position of the laser sensors and the curvature of the road during the measurement. Such measuring systems are commonly known.

The circuit 36 is used for continuous measurement of the laser angle and the axle load. The laser sensors measure the speed at right-angles to the direction in which the laser beam spreads. If the underlayer which is measured moves in more than one direction, it is important that the laser beams are held as closely as possible at right-angles to the direction it is desired to measure. Otherwise the movement of the surface in other directions contributes towards the measurement, which will hereby make the measurement inaccurate. In practice it is unavoidable that movements in other directions contribute to the measurement. There are two usable methods for making corrections for the inaccurate measurements which can arise if the laser or lasers are not at right-angles to that surface from which the deflections are to be measured. It is possible either to measure the angular deviation and let the computer correct the measuring results on the basis of the knowledge of how the angular deviations will influence the results of the measurement, or to use measurements of the angular deviations to control a servo-system which ensures that the angular deviation is minimal or zero. In practice it is also possible to use both correction methods simultaneously, and hereby gain the advantages of both methods. If the conditions of measurement are optimised, it is possible to separate the contributions to the measurements which arise from the speed of travel, and presumably also other undesired measurement contributions. On the basis of the measuring results, a servo-control system 35 can ensure that the laser stands as vertically as possible to the road or the surface of the rail. The system consists of a measuring unit which continuously monitors the laser's angle to the vertical, and on the basis of the measurements controls the servo-system to ensure that the sensors are constantly held in the vertical position. This measuring unit is suitably mounted on the chassis of the vehicle at the front and rear axle, and measures the distance to the road or the rail element as well as the distance to each wheel axle. This makes it possible to carry out a simultaneous calculation of the actual axle load.

Centrally in the unit there is provided a coordinating computer 31 which, in response to commands from an operating panel 32, controls the whole course of the measurement.

If the equipment is based on laser technique, use can be made, for example, of a number of laser sensors 20 of the type Dantec 55X Laser Doppler Vibrometre, or improved versions hereof. This measuring instrument measures the speed at which the rail or the roadway moves downwards. It will be possible to measure both the speed of the downward deflection and the speed at which the rail or the roadway straightens out. The measurements thus provide information concerning both the elasticity and the plasticity. Moreover, it is anticipated that the fixture of the rails on the sleepers will give rise to periodic variations in the measuring results, and these variations can be compensated for by suitable data processing.

The output signals from the laser sensors are processed in a signal processing circuit 30 which, for example, is a 57N10 Burst Spectrum Analyzer from the Dantec company. The result of this processing is sent further to the coordinat.ing computer, which at the same time receives signals from the trajectory measuring unit 34 and the position measuring unit 33. The computer thus compiles data concerning the speed of the surface at the place at which the measurement is taken, and the position of the laser sensors. The data can be continuously stored in a memory 37 for later processing and interpretation in additional circuits 38.

What is claimed is:

1. Method for non-contact measurement of the deflection of a road or rail while loaded by a travelling vehicle with weight-loaded drive-wheels, the speed of which in the direction of travel is measured, characterized in that the speed of the deflection is measured continuously while the vehicle is travelling by the measurement of the vertical speed of the road or rail using sensors which detect the Doppler frequency change in the reflections from at least one transmitted beam directed towards the roadway or the train rail, the beam obtained using one selected from the group consisting of a laser technique, radar technique, and an ultrasonic technique, after which the deflection can be calculated.

2. Method according to claim 1, characterized in that at the same time there are carried out speed measurements in the vertical direction at a number of positions at or around the loaded wheel or wheels.

3. Method according to claim 1, characterized in that the angle of the beam in relation to a chosen, fixed direction is also continuously determined.

4. Method according to claim 1 characterized in that the angle of the beam in relation to the trajectory of the road for the section being covered is also continuously determined.

5. Method according to claim 1 characterized in that the position of the loaded wheel is also continuously measured.

6. Method according to claim 1, characterized in that all measurement results are fed to a data processing unit with storage facilities, for one selected from the group consisting of continuous calculation and registration of the deflection or data which represents the characteristics of the underlayer, continuous calculation and registration of the underlayer's rigidity, and storage with a view to data processing later.

7. Equipment for non-contact measurement of the deflection of a road or train rail while using a vehicle with a load which influences at least one wheel, the speed of which is measured in the direction of travel, characterized in that it further comprises a) at least one device for the transmission of a wave selected from the group consisting of laser radiation, radar waves, and ultrasonic signals which gives rise to a Doppler frequency change at a relative movement between the device and the reflection point down towards the roadway, the rail or the rail's underlayer, b) at least one sensor arranged to detect the Doppler frequency change in the reflections of the emitted radiation, and c) an electronic circuit for the continuous registration of the detected Doppler frequency changes for the calculation of the speed of the deflection.

8. Equipment according to claim 7, characterized in that it comprises a number of devices/sensors (8) mounted on a common bar or beam (23).

9. Equipment according to claim 7, characterized in that it further comprises means for measuring the angle of the radiation in relation to a chosen, fixed direction.

10. Equipment according to claim 7, characterized in that it further comprises means for measuring the angle of the radiation in relation to the trajectory of the section of the road being measured.

11. Equipment according to claim 7, characterized in that it further comprises means (33) for the continuous measurement of the position of the loaded wheel.

12. Equipment according to claim 7, characterized in that it comprises a data processing unit with storage facilities, for one selected from the group consisting of continuous calculation and registration of the measured deflection or data which represents the characteristics of the road or the trainrail, continuous calculation and registration of a rigidity of the road or trainrail, and storage with a view to data processing later.

13. Method according to claim 1, wherein the speed of the deflection is measured using an electromagnetic beam.

14. Equipment according to claim 7, wherein the device transmits electromagnetic radiation.

* * * * *

UNITED STATES PATENT AND TRADEMARK OFFICE
CERTIFICATE OF CORRECTION

PATENT NO. : 6,119,353  
DATED : September 19, 2000  
INVENTOR(S) : Grønskov

Page 1 of 1

It is certified that error appears in the above-identified patent and that said Letters Patent is hereby corrected as shown below:

Title page,
ABSTRACT, line 7, "rodway" should read -- roadway --

Column 7,
Line 25, "coordinat.ing" should read -- coordinating --

Signed and Sealed this

Seventh Day of May, 2002

Attest:

Attesting Officer

JAMES E. ROGAN  
Director of the United States Patent and Trademark Office